United States Patent [19]

Wilson

[11] 4,067,444
[45] Jan. 10, 1978

[54] RETAINER BAR ASSEMBLY FOR MAIL CARRYING RACK

[75] Inventor: James D. Wilson, Newport Beach, Calif.

[73] Assignee: Banner Metals Division of Intercole Automation, Inc., Compton, Calif.

[21] Appl. No.: 741,887

[22] Filed: Nov. 15, 1976

[51] Int. Cl.² .............................................. B62B 11/00
[52] U.S. Cl. ...................................... 211/126; 211/4; 312/216
[58] Field of Search ........................... 211/126, 4, 133; 312/216, 217, 107.5

[56] References Cited

U.S. PATENT DOCUMENTS

| 1,613,732 | 1/1927 | Stockov | 312/216 |
| 1,678,736 | 7/1928 | Ledin | 312/216 |
| 1,695,896 | 12/1928 | Holden | 312/216 |
| 2,935,202 | 5/1960 | Doerwald | 211/4 |
| 3,002,800 | 10/1961 | McMahan | 312/216 |
| 3,022,895 | 2/1962 | Kingsley | 211/4 |
| 3,797,842 | 3/1974 | Swick et al. | 211/126 X |
| 3,902,603 | 9/1975 | Wilson | 211/126 |

Primary Examiner—Roy D. Frazier
Assistant Examiner—Robert W. Gibson, Jr.
Attorney, Agent, or Firm—Keith D. Beecher

[57] ABSTRACT

A retainer bar assembly is provided comprising a vertical bar pivotally mounted at one corner of a rack to be movable from a first position, in which trays may be inserted into or removed from the open front of the rack, to a second position in which the bar extends vertically upwardly across the front of the rack to hold the trays securely in the rack and to prevent the trays from falling out of the rack, as the rack is transported from one location to another.

2 Claims, 2 Drawing Figures

RETAINER BAR ASSEMBLY FOR MAIL CARRYING RACK

BACKGROUND OF THE INVENTION

A wheeled rack which has general utility in handling mail, or other articles, is described in Patent Application Ser. No. 477,805, which was filed June 10, 1974. The wheeled rack described in the patent application is constructed to carry trays of mail, with the trays being slidably tiered on rails within the rack. The rack has particular utility for carrying trays of sorted, or partially sorted mail from a main post office to substation post offices, and for carrying bags of unsorted mail back from the sub-station post offices to the main post offices.

A retainer bar assembly is described in U.S. Pat. No. 3,902,603 which issued Sept. 2, 1975 to the present inventor, which constitutes a simple mechanism which may be moved between a closed position and an open position. When the retainer bar assembly is in its closed position, it prevents the trays from falling out of the front of the rack, as the rack is transported from one location to another.

The retainer bar assembly of the present invention is generally similar to the retainer bar assembly described and claimed in the patent. However, the retainer bar assembly of the present invention is simpler and more effective than the previous assembly.

DETAILED DESCRIPTION OF THE ILLUSTRATED EMBODIMENT

Figure 1:
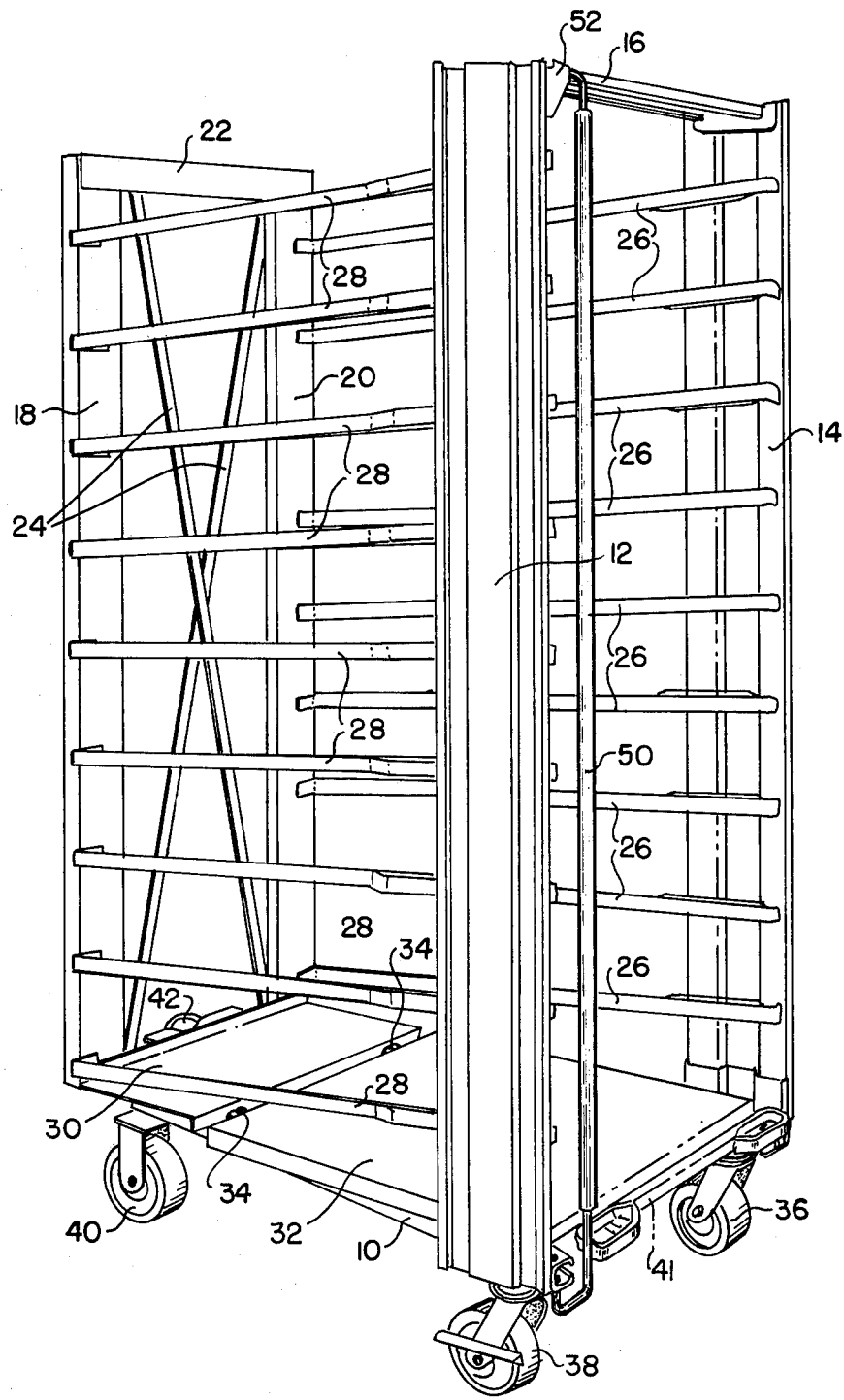
FIG. 1 is a perspective representation of a wheeled rack, which includes a retainer bar assembly constructed in accordance with one embodiment of the present invention.

The wheeled rack of FIG. 1 includes a lower frame 10, with two upright posts 12 and 14 mounted at the rear corners of the frame. The posts 12 and 14 may be formed of channel-like metal strips, as shown in the illustrated embodiment. A transverse brace 16 extends across the upper ends of posts 12 and 14.

The rack assembly also includes a pair of upright posts 18 and 20 attached to the front corners of frame 10, and a transverse brace 22 extends across the upper ends of posts 18 and 20. An X-brace 24 is also mounted on the front end of the rack, and extends between frame 10 and brace 22 to form an enclosure for the front end.

A plurality of strips 26 are welded or otherwise attached to posts 14 and 20, and they extend in generally spaced parallel relationship between the two posts. A like plurality of strips 28 are welded or otherwise attached to posts 12 and 18, and the latter stips also extend in generally spaced and parallel relationship between the two posts. The strips 26 and 28 form a plurality of spaced and parallel rails on each side of the rack assembly, and these rails serve slidably to receive a tier of mail-containing trays (not shown) through the open back of the rack.

The rack also has a fixed base 30 mounted on the forward end of the frame 10, and a further base 32 which is hinged to base 30 by hinges 34. The rack also includes casters 36 and 38 swively suspended from the rear corners of the frame 10, and further casters, such as caster 40 which are rigidly suspended from the forward corners of the frame.

A tugger bar unit 41 is mounted on the rear end of the frame 10, and a tow bar unit 42 is mounted on the front end of the frame. The tuggar bar unit and tow bar units are intended to receive triangular-shaped couplers, of the type described and claimed, for example, in U.S. Pat. No. 3,887,219, which issued June 3, 1975 to the present inventor, and which permit a train of wheeled racks, such as the rack shown in FIG. 1, to be transported from one location to another.

Figure 2:
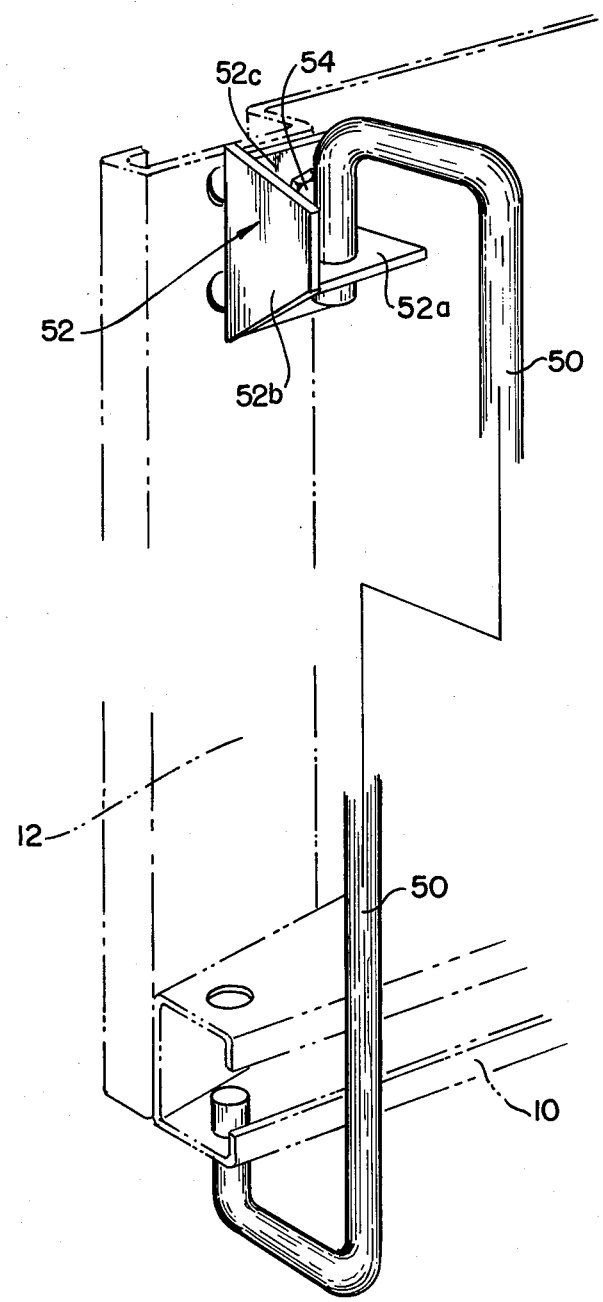
FIG. 2 is a fragmentary perspective representation of the retainer bar assembly of FIG. 1.

The bar assembly of the present invention includes a vertical locking bar 50. Bar 50 has a bent-over, U-shaped lower extremity which is received in appertures in the rear end of the frame 10, as best shown in FIG. 2. The upper end of bar 50 also has a U-shaped configuration which is received in an aperture in a bracket 52 secured to the upper end of post 12 by bolts, such as bolt 54. Bracket 52 has a generally horizontal planar portion 52a which is apertured to receive the end of bar 50, and it has a generally vertical planar portion 52b at one side of portion 52a, and it includes a third upright planar portion 52c at right-angles to the portions 52a and 52b, and which is apertured to receive the bolts 54. As best shown in FIG. 2, the portion 52b extends upwardly beyond the upper edge of the portion 52c.

The locking bar 50 may be inserted into the assembly by first inserting its lower end into the hole in frame 10, and then lifting the bar so that its upper end may be inserted into the hole in bracket 52. Then, if the locking bar is permitted to drop, while in the position of FIG. 2, it is held in a closed position by the forward edge of portion 52b of bracket 52. To move the locking bar to its open position, it is merely grasped, and moved upwardly until the upper end of the bar clears the upper edge of portion 52b of bracket 52, the bar can then be turned to an open position in which its upper end lies across the top of post 12, and is held in the position by the protruding upper edge of portion 52b of bracket 52.

The invention provides, therefore, an improved and simplified bar assembly for use in conjunction with a wheeled rack which serves securely to retain the trays within the rack; and which may easily be moved to its open position, when it is desired to remove the trays from the rack, or to insert new trays into the rack. The bar assembly of the invention is advantageous, in that it performs its intended function, and yet involves only an upright bar, and a simple bracket.

It will be appreciated that although a particular embodiment of the invention has been shown and described, modifications may be made. It is intended in the following claims to cover the modifications which come within the true spirit and scope of the invention.

What is claimed is:

1. In a rack assembly which includes a lower frame member; and a pair of spaced and parallel upright posts attached to said lower frame member and defining an open end for the assembly for trays to be inserted through said open end, the combination of: a bracket attached to the upper end of one of the posts having a first generally horizontal planar section with an aperture therein, and having a second generally vertical planar section adjacent to said horizontal section; and a vertical locking bar member having a bent-over U-shaped upper end with its extremity extending downwardly through the aperture in the horizontal section of said bracket and having a generally U-shaped lower end with its extremity extending upwardly through an aperture in the forward end of said frame member aligned with the aperture in the horizontal planar section of said bracket, said locking bar being vertically slidable to a limited extent in the apertures between a lower position and an upper position, said second section of said bracket preventing pivotal movement of said bar when the bar is in said lower position, and said bar being pivotal about the vertical axis of the apertures in said bracket and in said frame member when the bar is in its upper position, the second section of said bracket extending upwardly beyond the first section to form a shoulder for maintaining the bar in its open position, when the bar is moved to is upper position and pivoted about the aforsaid vertical axis over the top edge of said second section and then dropped to its lower position.

2. The combination defined in claim 1, in which said bracket has a third planar section extending perpendicularly to the first and second sections against the surface of the upper end said one of the posts to mount the bracket to said upper end.

* * * * *